United States Patent
Suda et al.

(10) Patent No.: US 7,615,305 B2
(45) Date of Patent: Nov. 10, 2009

(54) FUEL RESERVOIR FOR FUEL CELL

(75) Inventors: Yoshihisa Suda, Fujioka (JP); Takahiro Osada, Fujioka (JP); Kouji Nishimura, Fujioka (JP); Toshimi Kamitani, Fujioka (JP); Kunitaka Yamada, Fujioka (JP); Yasunari Kabasawa, Hamura (JP)

(73) Assignees: Mitsubishi Pencil Co., Ltd., Shinagawa-Ku, Tokyo (JP); Casio Computer Co., Ltd., Shibuya-Ku, Tokyo (JP)

( * ) Notice: Subject to any disclaimer, the term of this patent is extended or adjusted under 35 U.S.C. 154(b) by 0 days.

(21) Appl. No.: 11/628,552

(22) PCT Filed: Jun. 8, 2005

(86) PCT No.: PCT/JP2005/010483
§ 371 (c)(1),
(2), (4) Date: Sep. 7, 2007

(87) PCT Pub. No.: WO2005/122308
PCT Pub. Date: Dec. 22, 2005

(65) Prior Publication Data
US 2007/0298307 A1 Dec. 27, 2007

(30) Foreign Application Priority Data
Jun. 8, 2004 (JP) ............... 2004-170067

(51) Int. Cl.
*H01M 8/04* (2006.01)
*H01M 2/00* (2006.01)
*H01M 2/02* (2006.01)

(52) U.S. Cl. .............. 429/34; 429/12; 429/17

(58) Field of Classification Search ........ None
See application file for complete search history.

(56) References Cited

U.S. PATENT DOCUMENTS

| 5,364,711 A | 11/1994 | Yamada et al. |
| 5,432,023 A | 7/1995 | Yamada et al. |
| 6,391,927 B1 | 5/2002 | Ogura et al. |

(Continued)

FOREIGN PATENT DOCUMENTS

CN 1265626 9/2000

(Continued)

OTHER PUBLICATIONS

European Search Report dated Jun. 18, 2008 for European Application No. EP 05 74 89 80, 3 pages.

*Primary Examiner*—Dah-Wei Yuan
*Assistant Examiner*—Angela J. Martin
(74) *Attorney, Agent, or Firm*—Buchanan Ingersoll & Rooney PC

(57) ABSTRACT

In order to provide a fuel reservoir for a small-sized fuel cell which is suitably used as an electric power source for portable electronic appliances such as cellular phones, note type personal computers and PDA, assumed is a structure in which a fuel reservoir for a fuel cell detachably connected with a fuel cell main body is equipped with a fuel-storing vessel for storing a liquid fuel, a fuel discharge part and a follower which seals the liquid fuel and moves as the liquid fuel is consumed and into which a follower auxiliary member is inserted at a rear end of the liquid fuel, wherein the follower auxiliary member has no fluidity and is insoluble in the liquid fuel, and it has a cross-sectional area of 50% or more based on a cross-sectional area of the fuel-storing vessel in a diameter direction.

15 Claims, 11 Drawing Sheets

U.S. PATENT DOCUMENTS

| | | |
|---|---|---|
| 6,506,513 B1 | 1/2003 | Yonetsu et al. |
| 6,777,118 B2 | 8/2004 | Shioya |
| 6,824,905 B2 | 11/2004 | Shioya et al. |
| 6,916,565 B2 | 7/2005 | Shioya |
| 7,169,367 B2 | 1/2007 | Takeyama et al. |
| 2004/0126646 A1 | 7/2004 | Suda et al. |
| 2005/0233189 A1 | 10/2005 | Shioya |
| 2006/0151494 A1 | 7/2006 | Nakamura et al. |
| 2006/0172171 A1* | 8/2006 | Deinzer et al. ............ 429/34 |

FOREIGN PATENT DOCUMENTS

| | | |
|---|---|---|
| EP | 1 087 455 A | 3/2001 |
| EP | 1 313 160 A1 | 5/2003 |
| EP | 1 562 826 A0 | 8/2005 |
| JP | 59-066066 A | 4/1984 |
| JP | 05-258760 A | 10/1993 |
| JP | 05-307970 A | 11/1993 |
| JP | 6-188008 A | 7/1994 |
| JP | 2001-93551 A | 4/2001 |
| JP | 2001-102069 A | 4/2001 |
| JP | 2003-229158 A | 8/2003 |
| JP | 2003-299946 A | 10/2003 |
| JP | 2003-340273 A | 12/2003 |
| JP | 2004-063200 * | 2/2004 |
| JP | 2004-63200 A | 2/2004 |
| JP | 2004-247136 A | 9/2004 |
| JP | 2005-019291 A | 1/2005 |
| JP | 2005-032598 A | 2/2005 |
| JP | 2005-38803 A | 2/2005 |
| JP | 2005-071662 A | 3/2005 |
| JP | 2005-158667 A | 6/2005 |
| JP | 2005-228663 A | 8/2005 |
| WO | WO 2004/083036 A1 * | 9/2004 |

* cited by examiner (a)

(b)

(a)

(b)

(a)

(b)

(a)

(b)

FUEL RESERVOIR FOR FUEL CELL

TECHNICAL FIELD

The present invention relates to a fuel reservoir for a fuel cell, more specifically to a fuel reservoir suited to a small-sized fuel cell used as an electric power source for portable electronic appliances such as cellular phones, note type personal computers and PDA.

BACKGROUND ART

In general, a fuel cell comprises a cell on which an air electrode layer, an electrolyte layer and a fuel electrode layer are laminated, a fuel-supplying part for supplying fuel as a reducing agent to the fuel electrode layer and an air-supplying part for supplying air as an oxidizing agent to the air electrode layer, and it is an electric cell in which electrochemical reaction is caused in the cell between fuel and oxygen in the air to bring out electric power to the outside. Fuel cells of various types are developed.

In recent years, because of a rise in consciousness to environmental problems and energy saving, it is studied to use a fuel cell as a clean energy source for various uses. In particular, attentions have been paid to fuel cells which can generate electric power by only supplying directly a liquid fuel comprising methanol and water (refer to, for example, patent documents 1 and 2).

Among them, liquid fuel type fuel cells making use of capillary force for supplying a liquid fuel are known (refer to, for example, patent documents 3 to 7).

Liquid fuel type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

Such liquid fuel cells as merely making use of capillary force of a porous body and/or a fiber bundle disposed in a fuel reservoir are suited to reduction in a size in terms of constitution, but because fuel is supplied directly to a fuel electrode in the form of liquid, the fuel follows imperfectly during use over a long period of time under a use situation in which it is mounted in a small-sized portable appliance and in which the direction of a cell part is changed very often in every direction, and the trouble that the fuel is cut off from being supplied is brought about, so that it causes disturbing the fuel from being supplied constantly to an electrolyte layer.

On the other hand, known as one of countermeasures for solving the above defects is a fuel cell system in which a liquid fuel is introduced into a cell by virtue of capillary force and in which the liquid fuel is then vaporized in a fuel-vaporizing layer and used (refer to, for example, patent document 8). However, it has the problem that poor followability of the fuel which is a fundamental problem is not improved, and involved therein is the problem that it is difficult to reduce a size of the fuel cell having the above structure because of a system in which a liquid is vaporized and then used as fuel.

As described above, in conventional fuel reservoirs for fuel cells, the existing situation is that a liquid fuel is instably supplied in supplying the fuel directly to a fuel electrode to cause fluctuation in an output value during operation and that it is difficult to reduce a size thereof to such an extent that they can be mounted in portable appliances while maintaining stable characteristics.

Patent document 1: Japanese Patent Application Laid-Open No. 258760/1993 (claims, examples and others)
Patent document 2: Japanese Patent Application Laid-Open No. 307970/1993 (claims, examples and others)
Patent document 3: Japanese Patent Application Laid-Open No. 66066/1984 (claims, examples and others)
Patent document 4: Japanese Patent Application Laid-Open No. 188008/1994 (claims, examples and others)
Patent document 5: Japanese Patent Application Laid-Open No. 229158/2003 (claims, examples and others)
Patent document 6: Japanese Patent Application Laid-Open No. 299946/2003 (claims, examples and others)
Patent document 7: Japanese Patent Application Laid-Open No. 340273/2003 (claims, examples and others)
Patent document 8: Japanese Patent Application Laid-Open No. 102069/2001 (claims, examples and others)

DISCLOSURE OF THE INVENTION

Problems to be Solved by the Invention

In light of the problems and the existing situation in the conventional fuel reservoirs for fuel cells described above, the present invention has been made in order to solve them, and an object thereof is to provide a fuel reservoir for a fuel cell which allows a liquid fuel to be stably supplied directly to a fuel cell main body and enables the fuel cell to be reduced in a size and in which the liquid fuel is not lost in storing.

Means for Solving the Problems

Intensive studies on the conventional problems described above repeated by the present inventors have resulted in finding that a fuel reservoir for a fuel cell which meets the object described above is obtained by preparing a fuel reservoir detachably connected with a fuel cell main body, wherein the above fuel reservoir is equipped with a fuel-storing vessel for storing a liquid fuel, a fuel discharge part and a follower into which a follower auxiliary member having a specific structure is inserted at a rear end of the liquid fuel, and thus the present invention has come to be completed.

That is, the present invention comprises the following items (1) to (11).

(1) A fuel reservoir for a fuel cell detachably connected with a fuel cell main body, wherein the fuel reservoir is equipped with a fuel-storing vessel for storing a liquid fuel, a fuel discharge part and a follower which seals the liquid fuel and moves as the liquid fuel is consumed and into which a follower auxiliary member is inserted at a rear end of the liquid fuel; the follower auxiliary member has no fluidity and is insoluble in the liquid fuel, and it has a cross-sectional area of 50% or more based on a cross-sectional area of the fuel-storing vessel in a diameter direction.

(2) The fuel reservoir for a fuel cell as described in the above item (1), wherein the follower comprises at least one selected from liquids which are insoluble or slightly soluble in the liquid fuel and gelatinous matters of the liquids, and the follower has a specific gravity of 90 to 200% based on a specific gravity of the liquid fuel.

(3) A fuel reservoir for a fuel cell detachably connected with a fuel cell main body, wherein the fuel reservoir is equipped with a fuel-storing vessel for storing a liquid fuel, a fuel discharge part and a follower which seals the liquid fuel and moves as the liquid fuel is consumed at a rear end of the liquid fuel; the follower comprises a kneaded matter of a liquid which is insoluble or slightly soluble in the liquid fuel or a gelatinous matter of the liquid with solid comprising resin pieces and/or hollow resin pieces, and the follower has a specific gravity of 90 to 200% based on a specific gravity of the liquid fuel.

(4) The fuel reservoir for a fuel cell as described in the above item (2) or (3), wherein the insoluble or slightly soluble liquid comprises a non-volatile or scarcely volatile organic solvent, and the gelatinous matter of the insoluble or slightly soluble liquid comprises a non-volatile or scarcely volatile organic solvent and a thickener.

(5) The fuel reservoir for a fuel cell as described in the above item (4), wherein the non-volatile or scarcely volatile organic solvent is at least one selected from polybutene, mineral oils, silicone oils and liquid paraffins.

(6) The fuel reservoir for a fuel cell as described in the above item (4), wherein the thickener is at least one selected from styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

(7) The fuel reservoir for a fuel cell as described in the above item (1) or (2), wherein the follower auxiliary member is any of solid, a hollow structure and a porous body.

(8) The fuel reservoir for a fuel cell as described in any one of the above items (1) to (7), wherein the liquid fuel is at least one selected from a methanol solution, an ethanol solution, dimethyl ether (DME), formic acid, hydrazine, an ammonia solution, ethylene glycol, a saccharide aqueous solution and sodium boron hydride.

(9) The fuel reservoir for a fuel cell as described in any of the above items (1) to (8), wherein a surface free energy of at least a wall face of the fuel-storing vessel which is brought into contact with the liquid fuel is controlled to a lower value than a surface free energy of the liquid fuel.

(10) The fuel reservoir for a fuel cell as described in any of the above items (1) to (9), wherein the fuel cell main body assumes a structure in which plural unit cells each of which is formed by constructing an electrolyte layer on an outer surface of a fuel electrode body and constructing an air electrode layer on an outer surface of the electrolyte layer are joined and in which a fuel-supplying member connected with the fuel reservoir is connected with the unit cells to supply the liquid fuel.

(11) A fuel reservoir for a fuel cell detachably connected with a fuel cell main body, wherein the fuel reservoir is equipped with a fuel-storing vessel for storing a liquid fuel, a fuel discharge part and a follower which seals the liquid fuel and moves as the liquid fuel is consumed and into which a follower auxiliary member is inserted at a rear end of the liquid fuel, and the follower auxiliary member has a hollow structure or a porous body which is insoluble in the liquid fuel.

Effects of the Invention

According to the present invention, provided is a fuel reservoir for a fuel cell in which a liquid fuel is stably and efficiently supplied directly to a fuel cell main body and which does not cause loss of the liquid fuel in storing and enables the fuel cell to reduce a size.

LIST OF REFERENCE NUMERALS AND LETTERS

A Fuel reservoir for a fuel cell
F Liquid fuel
10 Fuel-storing vessel
11 Fuel discharge part
12 Valve
17 Follower
18 Follower auxiliary member

BEST MODE FOR CARRYING OUT THE INVENTION

The embodiments of the present invention shall be explained below in details with reference to the drawings.

Figure 1:
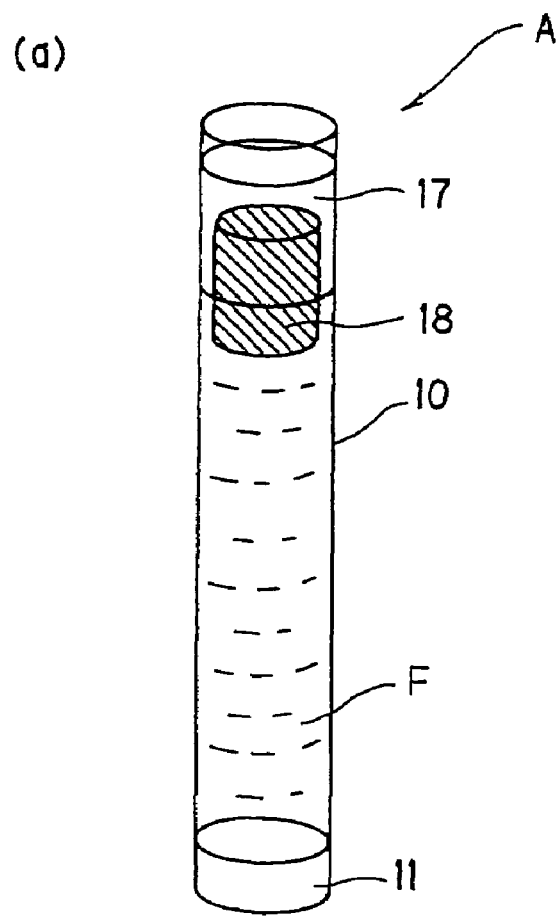
FIGS. 1(a) and (b) show the fuel reservoir for a fuel cell of the first embodiment according to the present invention, wherein (a) is the outline drawing shown in a vertical cross-sectional embodiment, and (b) is the transverse cross-sectional drawing showing an essential part thereof.
Figure 1:
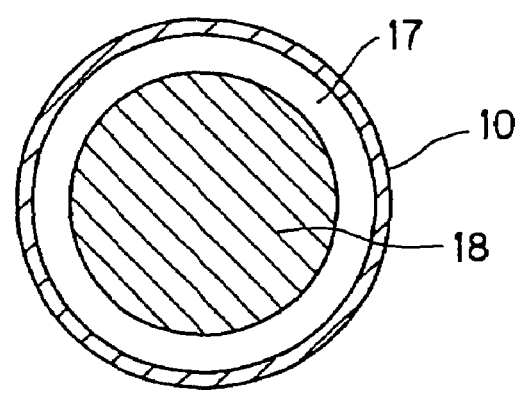
Figure 2:
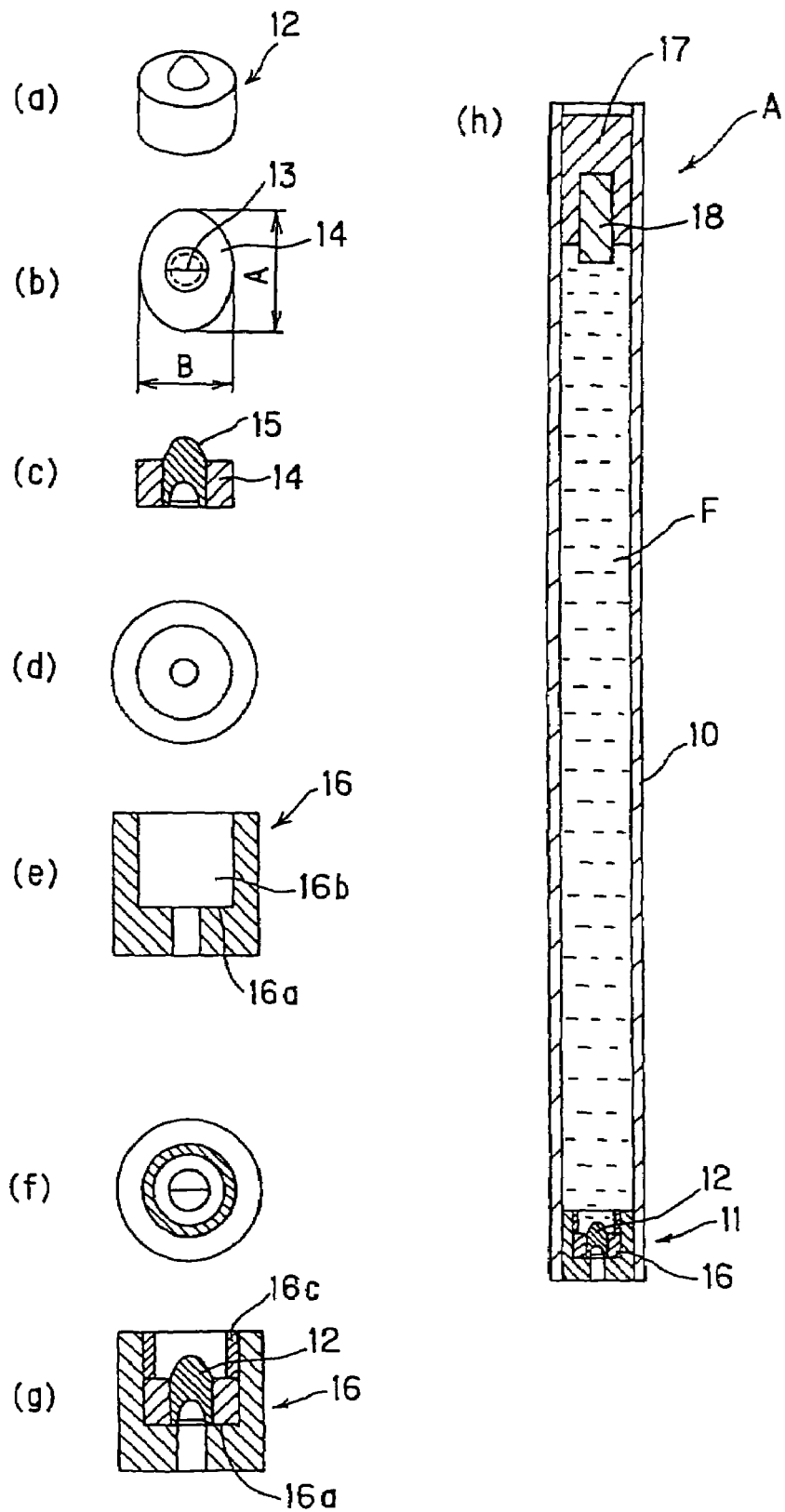
FIG. 2(a) to (h) shows the structure of a valve provided in the fuel discharge part of the first embodiment according to the present invention, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; (g) is a vertical cross-sectional drawing of a state in which the valve is installed in the adaptor; and (h) is a vertical cross-sectional drawing of the fuel reservoir.

FIG. 1 to FIG. 2 show a fundamental aspect (first embodiment) of a fuel reservoir for a fuel cell A showing the fundamental embodiment of the present invention.

The fuel reservoir for a fuel cell A of the present first embodiment is a fuel reservoir detachably connected to a fuel cell main body, wherein it is equipped with a fuel-storing vessel 10 of a tube type for storing a liquid fuel F, a fuel discharge part 11 and a follower 17 which seals the liquid fuel and moves as the liquid fuel is consumed and into which a follower auxiliary member 18 is inserted at a rear end of the liquid fuel F; the follower auxiliary member 18 described above is constituted from a material which has no fluidity and is insoluble in the liquid fuel F and which has a cross section of 50% or more based on a cross-sectional area of the fuel-storing vessel 10 in a diameter direction.

The fuel-storing vessel 10 of a tube type described above is preferably constituted from a material having storage stability and durability against a liquid fuel stored therein, gas non-permeability (gas non-permeability against oxygen gas, nitrogen gas and the like) and light transmittance so that the remaining amount of the liquid fuel can visually be observed.

The material of the fuel-storing vessel 10 includes, for example, metals such as aluminum and stainless steel, synthetic resins and glass when light transmittance is not required, and from the viewpoints of the above visibility of the remaining amount of the liquid fuel, gas non-permeability, reduction in a cost in producing and assembling and easiness of production, it includes preferably materials having a single layer structure and a multilayer structure of two or more layers comprising a single kind or two or more kinds of resins such as polypropylene, polyvinyl alcohol, ethylene.vinyl alcohol copolymer resins, polyacrylonitrile, nylon, cellophane, polyethylene terephthalate, polycarbonate, polystyrene, polyvinylidene chloride and polyvinyl chloride each having the respective characteristics described above. In the case of the multilayer structure, as long as at least one layer is constituted from a resin having the performances described above (the gas non-permeability and the like), problems in terms of actual use are not involved therein even if the remaining layers are constituted from ordinary resins. Such tubes having a multilayer structure can be produced by extrusion molding, injection molding and co-extrusion molding.

The fuel discharge part 11 is equipped with a valve 12 for sealing communication between the inside and the outside of the tubular fuel-storing vessel 10, and a structure in which the valve 12 is installed in the fuel discharge part 11 directly or via a valve adaptor is assumed in the present embodiment. This valve 12 assumes the same structure as that of a member used in writing instruments, and the liquid fuel F stored directly in the fuel-storing vessel 10 is protected, as shown in FIG. 2(a) to (c), from foreign matters such as air coming from the periphery of a fuel-supplying tube described later due to a change in barometric pressure and temperature.

The above valve 12 allows the fuel-storing vessel 10 to be communicated between the inside and the outside thereof by inserting a liquid fuel-supplying member, and is provided with a communicating part 13 comprising a linear slit for supplying the liquid fuel F in the inside of the fuel-storing vessel 10 to the outside. In addition thereto, when the valve 12 is installed in the fuel discharge part 11 or the valve adaptor, the valve 12 is compressed to an axis direction by a valve outer periphery part 14, whereby a compressing force works on the communicating part 13 described above. In the present embodiment, the valve is elliptic as shown in FIG. 2(b); a slit 13 which is a communicating part is provided in a minor axis direction; the outer periphery part 14 is compressed in a major axis direction; and the compressing force works in a direction in which the slit 13 is closed.

The communicating part 13 described above is formed by a linear slit, and it shall not specifically be restricted as long as it assumes a structure in which the fuel-storing vessel 10 can be communicated by inserting a liquid fuel-supplying member to supply the liquid fuel F in the fuel-storing vessel 10 to the outside. It may be a cross-shaped or radial slit, a structure in which plural slits are formed so that the respective slits are crossed in the same spot, a circular hole or a rectangular hole. It is preferably the linear slit described above. The shape of the outer peripheral part 14 shall not specifically be restricted, and it can be formed in a circular shape as well as an elliptical shape as is the case with the embodiment described above.

A convex tapered face (projection) 15 is preferably formed on an inner face side of the valve 12 toward an inside of the fuel-storing vessel 10 so that the liquid fuel-supplying member can smoothly be inserted when inserting it.

The fuel discharge part 11 described above is equipped with an adaptor 16 as shown in FIGS. 2(d) and (e), and the adaptor 16 is formed in a cylindrical shape and comprises a main body part 16b in which stopper part 16a is formed on an inner peripheral face thereof and a fixing member 16c which is formed in a cylindrical shape. The valve 12 having the construction described above is interposed between the stopper part 16a and the fixing member 16c.

The combination of the valve 12 and the adaptor 16 includes a case of an elliptical slit valve and a circular adaptor as shown in FIG. 2, and in reverse, it may be a circular slit valve and an elliptical adaptor. In this case, a slit direction of the slit valve has to be consistent with a major axis of the adaptor.

The valve 12 having the structure described above assumes a structure in which foreign matters such as air are prevented from coming in during suspending use (no use) thereof. This is to prevent troubles such as leaking and blowing of the fuel caused by increase of a pressure in the liquid fuel-storing vessel 10 which is brought about by coming in of air.

The valve 12 and the adaptor 16 are preferably, from the viewpoint of preventing more effectively leaking of the liquid fuel, those which have the structures described above and comprise materials having low gas permeability toward the liquid fuel F and which are constituted from materials having a compression set of 20% or less prescribed in JIS K 6262-1997.

The materials for the above valve 12 and adaptor 16 shall not specifically be restricted as long as they have storage stability, durability against the liquid fuel F stored and gas non-permeability and elasticity by which the valve and adaptor can be adhered tightly to the fuel-supplying tube and have the characteristics described above. They include synthetic resins such as polyvinyl alcohol, ethylene.vinyl alcohol copolymer resins, polyacrylonitrile, nylon, cellophane, polyethylene terephthalate, polycarbonate, polystyrene, polyvinylidene chloride and polyvinyl chloride, rubbers such as natural rubber, isoprene rubber, butadiene rubber, acrylonitrile butadiene rubber, 1,2-polybutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber and urethane rubber and thermoplastic elastomers. They can be produced by conventional injection molding and vulcanizing molding.

The liquid fuel F used includes a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, an ammonia solution, ethylene glycol, a saccharide aqueous solution and a sodium boron hydride aqueous solution can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

The follower 17 is brought into contact with a rear end of the liquid fuel F stored in the fuel-storing vessel 10 to seal the liquid fuel F, and it moves as the fuel is consumed. It prevents the liquid fuel in the fuel-storing vessel 10 from leaking and vaporizing, and it prevents air from coming into the liquid fuel.

This follower 17 is required not to be dissolved or diffused in the liquid fuel F. If it is dissolved or diffused in the liquid fuel F, it is considered that the liquid fuel in the fuel-storing vessel 10 which is a fuel storing tank leaks and vaporizes and that not only it does not play a role as a fuel storing tank, but also a substance constituting the follower 17 comes into the fuel electrode of the fuel cell main body together with the liquid fuel F to exert an adverse effect on the reaction in a certain case. The preferred characteristics of the follower 17 used in the present invention are selected taking these conditions into consideration.

The follower 17 which can be used comprises preferably a liquid insoluble or slightly soluble in the liquid fuel F or a gelatinous matter of the liquid, and the follower has preferably a specific gravity of 90 to 200% based on a specific gravity of the liquid fuel F.

The insoluble or slightly soluble liquid includes at least one selected from non-volatile or slightly volatile organic solvents such as polybutene, mineral oils, polyglycols, polyesters, silicone oils and liquid paraffins.

The polybutene which can be used includes, for example, Nissan Polybutene N (manufactured by NOF Corporation), LV-7, LV-10. LV-25, LX-50, LV-100, HV-15, HV-35, HV-50, HV-100, HV-300, HV-1900 and HV-3000 (all manufactured by Nippon Petrochemicals Co., Ltd.) and 35R (manufactured by Idemitsu Kosan Co., Ltd.) which are commercially available products. The mineral oils include, for example, Diana Process Oil MC-W90, PS-430 and PS-90 (all manufactured by Idemitsu Kosan Co., Ltd.) which are commercially available products.

The silicone oils include, for example, KF-96 0.65 to 30,000 (manufactured by Shin-Etsu Chemical Co., Ltd.).

The above non-volatile or slightly volatile organic solvents can be used alone or in combination of two or more kinds thereof.

The gelatinous matter of the insoluble or slightly soluble liquid is constituted from a matter containing the non-volatile or slightly volatile organic solvent described above and a thickener.

The thickener used may be any one as long as it is soluble or swollen in the non-volatile or slightly volatile organic solvent described above and can turn the insoluble or slightly soluble liquid into a gelatinous matter. Capable of being used is, for example, at least one selected from styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica, acetalkoxy-aluminum dialkylates, fatty acid metal salts and modified clay.

The styrene base thermoplastic elastomer (SBC) is a thermoplastic elastomer (TPE) which has a polystyrene block and a rubber intermediate block and in which a polystyrene part forms physical cross-linkage (domain) to become a cross-linking point, and capable of being used are a linear type or a radial type of TPE such as S-B-S, S-I-S, S-EB-S, (S-B)nX, S-EP-S, V-SI-S and the like, which are obtained by combination of polystyrene (S) which is a hard segment with polybutadiene (B), polyisoprene (I), ethylene.butylene (EB), ethylene.propylene (EP) and vinyl-polyisoprene (V-I) which are soft segments and hydrogenated matters thereof.

The vinyl chloride base thermoplastic elastomer (TPVC) which can be used is TPE in which PVC and NBR are used for a hard segment and in which PVC is used for a soft segment, and the olefin base thermoplastic elastomer (TPO) is TPE in which polyolefin such as polypropylene and polyethylene is used for a hard segment and in which EPDM is used for a soft segment.

The polyamide base thermoplastic elastomer (TPAE) which can be used is a block copolymer in which nylon is used for a hard segment and in which polyester or polyol (PTMG or PPG) is used for a soft segment; the polyester base thermoplastic elastomer (TPEE) is a multiblock copolymer in which high crystalline aromatic polyester having a high melting point, for example, polybutylene terephthalate (PBT) is used for a hard segment and in which amorphous polyether having a low glass transition temperature (for example, −70° C. or lower), for example, polytetramethylene ether glycol (PTMG) is used for a soft segment and TPE of a type in which aliphatic polyester is used for a soft segment; and the polyurethane base thermoplastic elastomer (TPU) includes an incompletely plasticized type having partial cross-linkage in a molecule and a completely linear polymer of a complete thermoplastic type, wherein a polymer chain comprising diisocyanate and short chain glycol is a hard segment, and a polymer chain comprising diisocyanate and polyol is a soft segment, from which various polymers can be formed according to the kinds and the amounts of diisocyanate and long and short chain polyols, and a caprolactone type, an adipic acid type and a polytetramethylene glycol type [a PTMG type (or an ether type)] can be used.

Hydrophobic silica and the like (Aerosil R-974D manufactured by Nippon Aerosil Co., Ltd. as a commercially available product) can be used as the fine particle silica.

The above thickeners can be used alone or in combination of two or more kinds thereof.

The follower comprising the gelatinous matter containing the above non-volatile or slightly volatile organic solvent and the thickener contains 70 to 99.8% by weight (hereinafter referred to merely as [%]), preferably 85 to 99.5% and more preferably 87 to 99.5% of the non-volatile or slightly volatile organic solvent and 0.2 to 30%, preferably 0.5 to 15% and more preferably 0.5 to 10% of the thickener each based on the total amount of the follower.

The follower 17 which can be used comprises, as described above, an insoluble or slightly soluble liquid or a gelatinous matter of the liquid, and the follower has preferably a specific gravity of 90 to 200%, more preferably 95 to 150% based on a specific gravity of the liquid fuel F in that it follows efficiently as the fuel is consumes.

In the present invention, a specific gravity of the follower is varied according to the kind and the concentration of the liquid fuel used. That is, the specific gravities of the respective liquid fuels used at some concentrations are shown in the following Table 1.

TABLE 1

| Specific gravities of the respective liquid fuels | |
|---|---|
| Kind of liquid fuel | Specific gravity |
| Methanol | 0.792 |
| Ethanol | 0.79 |

TABLE 1-continued

| | |
|---|---|
| Dimethyl ether | 0.661 |
| Formic acid | 1.241 |
| Hydrazine | 1.00 |
| Aqueous ammonia (concentration 24%) | About 1 |
| Ethylene glycol | 1.10 |
| Sucrose aqueous solution (concentration 10%) | About 1 |
| Sodium boron hydride | About 1 |

Concentration and specific gravity of methanol

| Methanol concentration (wt %) | Specific gravity |
|---|---|
| 0 | 0.998 |
| 10 | 0.982 |
| 20 | 0.967 |
| 30 | 0.952 |
| 40 | 0.935 |
| 50 | 0.916 |
| 60 | 0.895 |
| 70 | 0.872 |
| 80 | 0.847 |
| 90 | 0.820 |
| 100 | 0.792 |

In the present invention, when 70% methanol (specific gravity: 0.872) is used as the liquid fuel F, a specific gravity of the follower comprising the insoluble or slightly soluble liquid or the gelatinous matter of the liquid is preferably 0.785 to 1.744, more preferably 0.785 to 1.308, and when DME (specific gravity: 0.661) is used as the liquid fuel F, a specific gravity of the follower is preferably 0.595 to 1.322, more preferably 0.5915 to 0.9915.

In the present invention, the liquid fuels used for the fuel cell have a small specific gravity (most of them have 1 or less), and therefore the follower falling in the preferred range of a specific gravity can be prepared by suitably combining the kind and a use amount of the insoluble or slightly soluble liquid described above and the kind and a use amount of the thickener, and the production process thereof.

A use amount of the follower 17 having the structure described above is preferably 0.01 to 0.5 time, more preferably 0.1 to 0.2 time based on a use amount of the liquid fuel (weight ratio) in terms of a good followability and an impact resistance in falling. For example, when a storing vessel is charged with 2 ml of a 70% methanol solution as the liquid fuel, an amount of the follower is preferably 0.2 to 0.4 ml.

The follower auxiliary member 18 inserted into the follower 17 having the structure described above is inserted into the follower 17 in order to allow the follower 17 to follow well without causing discontinuity of following even when the fuel is consumed at a large speed or the fuel-storing vessel of a tube type has a large diameter so as to load a large amount of the liquid fuel.

The follower auxiliary member 18 used has to have a cross-sectional area of 50% or more, preferably 80 to 95% based on a cross-sectional area of the fuel-storing vessel 10 in a diameter direction in terms of exhibiting good followability even when the fuel cell is consumed at a large speed is used or the fuel-storing vessel has a large diameter so as to load a large amount of the liquid fuel.

In the follower auxiliary member 18 having a cross-sectional area of less than 50% based on a cross-sectional area of the fuel-storing vessel 10 in a diameter direction, the follower is deteriorated in followability in a certain case when the fuel cell is consumed at a large speed or the fuel-storing vessel has a large diameter so as to load a large amount of the liquid fuel, and therefore it is not preferred.

The shape of the follower auxiliary member 18 may be any one as long as it has the cross-sectional area described above, and it includes, for example, a cylindrical shape, a quadrangular prism shape, a triangular prism shape, a spherical shape and a shape similar to a cross section of the fuel reservoir. A length thereof is preferably 30 to 70% based on the entire length of the follower 17 in terms of exhibiting good followability.

The follower auxiliary member 18 may assume a state in which it is inserted into the insoluble or slightly soluble liquid or the gelatinous matter of the liquid or in which a part of the follower auxiliary member 18 comes out from a lower part of the insoluble or slightly soluble liquid or the gelatinous matter 17a of the liquid.

The follower auxiliary member 18 may be any one as long as it has the characteristic that it has a cross-sectional area of 50% or more based on the cross-sectional area described above, and it includes more preferably a matter having a lower specific gravity than that of the liquid fuel F used. It can be constituted from, for example, polypropylene, ethylene.vinyl alcohol copolymers, polyacrylonitrile, nylon, polyethylene terephthalate, polycarbonate, polystyrene, polyvinylidene chloride, polyvinyl chloride and various rubbers, and solids comprising the above materials or hollow structures and porous structures thereof can preferably be used.

In the present embodiment, assumed is a state in which the insoluble or slightly soluble liquid or the gelatinous matter 17a of the liquid is present, as shown in FIG. 1(b) and FIG. 2(h), (in the space) between the follower auxiliary member 18 and the fuel-storing vessel 10 and in which a part of the follower auxiliary member 18 comes out from a lower part of the insoluble or slightly soluble liquid or the gelatinous matter 17a of the liquid.

In the present embodiment, the fuel-storing vessel has an inner diameter of 6.0 mm, an outer diameter of 8.0 mm and a length of 100 mm; the liquid fuel F is a 70% methanol solution (specific gravity: 0.872); 17a is the gelatinous matter (specific gravity: 1.0) of the insoluble or slightly soluble liquid; the follower auxiliary member 18 is made of polypropylene and assumes a hollow structure, and it has a specific gravity of 0.5, a length of 70% based on the entire length of the follower and a cross-sectional area of 80% based on a cross-sectional area of the fuel-storing vessel 10 in a diameter direction.

Figure 3:
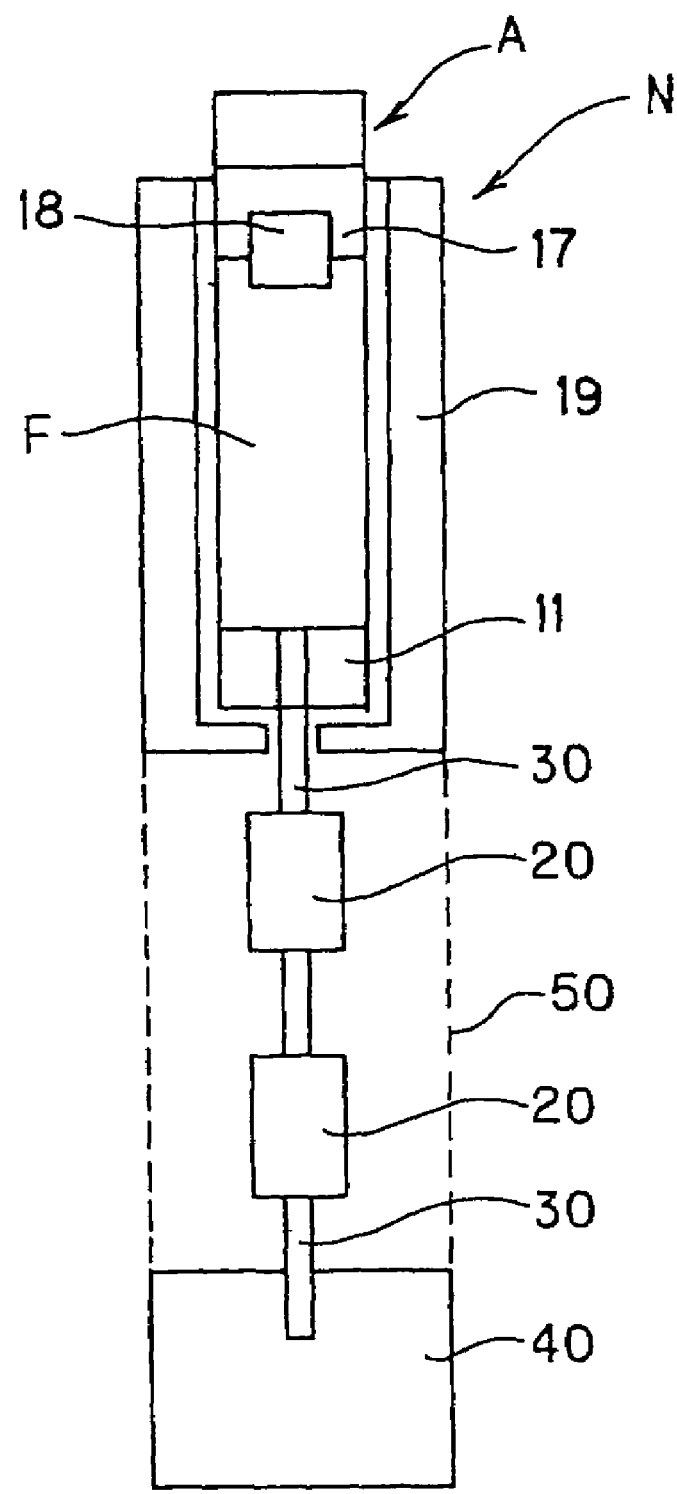
FIG. 3 is an outline cross-sectional drawing showing one example of a state in which the fuel reservoir for a fuel cell of FIG. 1 is connected to the fuel cell main body and used as a fuel cell.
Figure 4:
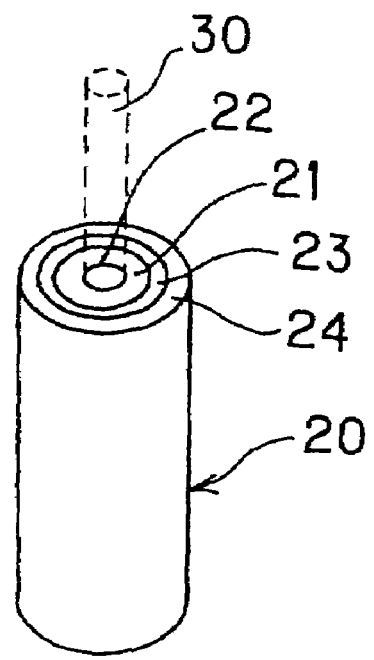
FIGS. 4(a) and (b) are a perspective drawing and a vertical cross-sectional drawing which explain a unit cell 20 of a fuel-cell.
Figure 4:
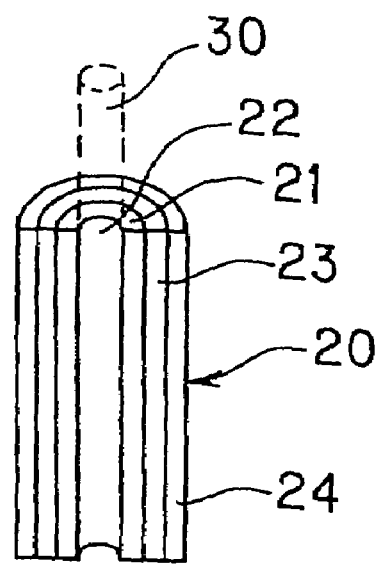

This fuel reservoir A for a fuel cell is, as shown in FIG. 3 and FIG. 4, detachably connected with the fuel cell main body N and used.

That is, the fuel cell main body N is equipped, as shown in FIG. 3 and FIG. 4, with unit cells (fuel-cell unit) 20, 20 formed by constructing an electrolyte layer 23 on the outer surface of a fuel electrode body 21 comprising a fine porous carbonaceous substance and constructing an air electrode layer 24 on the outer surface of the electrolyte layer 23, a fuel-supplying member 30 connected with the fuel reservoir A and having a penetrating structure and a used-fuel storing tank 40 provided at a rear end of the fuel-supplying member 30. Assumed is a structure in which the respective unit cells 20, 20 described above are joined in series and in which the fuel is supplied in order by means of the fuel-supplying member 30. The fuel reservoir A described above has an exchangeable cartridge structure and assumes a constitution in which it is inserted into a supporter 19 in the fuel cell main body N.

In this embodiment, the liquid fuel F is directly stored as shown in FIG. 1 to FIG. 3, and the fuel is supplied by means of the fuel-supplying member 30 inserted into the valve 12 which is installed in a fuel discharge part 11 at a lower part of the fuel-storing vessel 10 for storing the liquid fuel F.

The fuel-storing vessel 10, the fuel discharge part 11 and the fuel-supplying member 30 in the fuel reservoir A are connected respectively with interfitting. In this case, if the respective members have a higher surface free energy than that of the liquid fuel F, the liquid fuel is liable to get into a gap at the junctions, and the possibility that the liquid fuel F leaks is enhanced. Accordingly, a surface free energy of the above members is preferably controlled to a lower level than that of the liquid fuel F at least on a surface thereof brought into contact with the liquid fuel F. In respect to a method for controlling this, a surface of the fuel-storing vessel 10 brought into contact with the liquid fuel can be subjected to water repellent film-forming treatment by coating a water repellent agent of a silicone base or a fluorine base.

The respective unit cells 20 of the fuel cell have, as shown in FIGS. 4(a) and (b), the fuel electrode body 21 comprising a fine porous carbonaceous pillar body and in addition thereto, have a through part 22 in a central part thereof through which the fuel-supplying member 30 passes, and they assume a structure in which the electrolyte layer 23 is constructed on the outer surface of the fuel electrode body 21 described above and in which the air electrode layer 24 is constructed on the outer surface of the electrolyte layer 23. The respective unit cells 20 of the fuel cell generate an electromotive force of about 1.2 V per cell in theory.

The fine porous carbonaceous pillar body constituting the above fuel electrode body 21 may be any ones as long as they are porous structures having fine communication holes, and it includes, for example, carbon composite molded articles which comprise a three-dimensional network structure or a point sintered structure and which are constructed from amorphous carbon and carbon powder, isotropic high density carbon molded articles, carbon fiber paper-making molded articles and activated carbon molded articles, and the carbon composite molded articles which comprise amorphous carbon and carbon powder and which have fine communication holes are preferred from the viewpoint of easiness in controlling reaction in the fuel electrode of the fuel cell and further rise in the reaction efficiency.

The carbon powder used for producing the above composite bodies comprising a porous structure is preferably at least one (alone or combination of two or more kinds thereof) selected from highly oriented pyrolytic graphite (HOPG), kish graphite, natural graphite, artificial graphite, carbon nanotube and fullerene.

A platinum-ruthenium (Pt—Ru) catalyst, an iridium-ruthenium (Ir—Ru) catalyst and a platinum-tin (Pt—Sn) catalyst are formed on the outer surface of the fuel electrode body 21 by a method in which a solution containing the above metal ions or a metal fine particle precursor such as metal complexes is subjected to impregnating or dipping treatments and then subjected to reducing treatment and an electrodeposition method of metal fine particles.

The electrolyte layer 23 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and a polymer as a membrane material, to be specific, composite membranes using zeolite as the inorganic compound and styrene-butadiene base rubber as the polymer, and hydrocarbon base graft membranes.

The air electrode layer 24 includes porous carbonaceous bodies on which platinum (Pt), palladium (Pd) and rhodium (Rh) are carried by a method using a solution containing the metal fine particle precursor described above and which comprise a porous structure.

The fuel-supplying member 30 shall not specifically be restricted as long as it has a penetrating structure in which it can be inserted into the valve 12 in the fuel discharge part 11 of the fuel reservoir A to supply the liquid fuel F to the respective unit cells 20, and it includes, for example, those comprising porous bodies having capillary force which are constituted from felts, sponges, sintered bodies such as resin particle-sintered bodies and resin fiber-sintered bodies and fiber bundles comprising one or combination of two or more kinds of natural fibers, animal fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 20.

The used-fuel storing tank 40 is disposed at an end of the fuel-supplying member 30. In this case, it provides no problems to bring the used-fuel storing tank 40 into direct contact with the end of the fuel-supplying member 30 to occlude the used-fuel directly in an occlusion body, and a sliver, a porous body or a fiber bundle may be provided as a feed at a junction brought into contact with the fuel-supplying member 30 to set it as a discharge passage for the used fuel.

The liquid fuel supplied by the fuel-supplying member 30 is used for reaction in a unit cell 20 of the fuel cell, and since a fuel-supplying amount is linked with a fuel-consuming amount, the liquid fuel which is discharged to the outside of the cell without reacting is scarcely found, so that a treating system is not required at a fuel outlet side as is the case with conventional liquid fuel type fuel cells. However, assumed is a structure in which when the fuel comes to be supplied in excess depending on an operation status, the liquid fuel which is not used for the reaction can be stored in the storing tank 40 to prevent an adverse effect from being exerted on the reaction in the electrode.

Numeral 50 is a member comprising a mesh structure which joins the fuel reservoir A with the used-fuel storing tank 40 and which allows the liquid fuel to be surely supplied from a fuel-storing vessel 10 directly to each of the respective unit cells 20, 20 via the fuel-supplying member 30.

In the fuel cell using the fuel reservoir A thus constituted, the liquid fuel is supplied from the fuel reservoir A to the fuel-supplying member 30 inserted into the valve 12 in the fuel discharge part 11 which is a fuel supplying part or a fuel electrode body 21 having a penetrating structure and introduced into the unit cells 20, 20 by virtue of the penetrating structure.

In the present invention, the fuel reservoir A detachably connected with the fuel cell main body is equipped with the fuel-storing vessel 10 for storing the liquid fuel F, the fuel discharge part 11 and the follower 17 which seals the liquid fuel and moves as the liquid fuel is consumed and into which the follower auxiliary member 18 is inserted at a rear end of the liquid fuel F; the follower auxiliary member 18 is constituted from a material which has no fluidity and is insoluble in the liquid fuel F and which has a cross-sectional area of 50% or more based on a cross-sectional area of the fuel-storing vessel 10 in a diameter direction. Accordingly, the follower 17 into which the follower auxiliary member 18 is inserted moves as the fuel is consumed with electric power generation by the fuel cell to follow reduction in a volume of the liquid fuel, and in addition thereto, the follower 17 moves as well when the fuel reservoir (liquid fuel) is heated by operation of the fuel cell, whereby it can follow as well expansion in the volume. Accordingly, provided is the fuel reservoir for a fuel cell which stably supplies the liquid fuel F directly to the fuel cell main body N and does not cause loss of the liquid fuel in storage and which can reduce a size of the fuel cell.

The follower auxiliary member 18 constituted from a matter having a cross-sectional area of 50% or more based on a cross-sectional area of the fuel-storing vessel 10 in a diameter direction is inserted into the follower 17, and therefore the follower 17 can be allowed to follow well without causing discontinuity of following even when the fuel is consumed at a large speed or when the fuel-storing vessel of a tube type has a large diameter so as to load a large amount of the liquid fuel.

In the embodiment described above, the valve 12 for sealing communication between the inside and the outside of the fuel-storing vessel 10, that is, one into which the liquid fuel-supplying member 30 is inserted to communicate between the inside and outside of the fuel-storing vessel 10 is installed in the fuel discharge part 11. The valve has a communicating part 13 for supplying the liquid fuel F in the inside of the fuel-storing vessel 10 to the outside, and when the valve 12 is installed in the fuel discharge part 11, the valve 12 is compressed to an axis direction by an outer periphery part 14 of the valve, whereby compressing force is allowed to work on the communicating part 13, so that the liquid fuel F can more effectively be prevented from leaking from the communicating part 13. Also, the fuel-storing vessel 10 is provided with an adaptor 16 to assume a structure in which the valve 12 is interposed between a stopper part 16*a* and a fixing member 16*c* in the adaptor 16 and which is easily assembled, so that the valve plug 12 can stably be fixed in the fuel discharge part 11 provided in the storing vessel 10.

The fuel-storing vessel is not substituted with air as the fuel is discharged, and therefore even if the fuel discharge part is turned upward in a state in which the fuel is discharged to some extent, the fuel can be discharged well since the fuel is always brought into contact with the fuel discharge part.

Further, in the embodiment described above, capillary force is present at least in the fuel electrode body 21 and/or the fuel-supplying member 30 brought into contact with the fuel electrode body 21, and this capillary force makes it possible to supply stably and continuously the fuel directly from the fuel-storing vessel 10 to each of the unit cells 20, 20 without bringing about back flow and interruption. More preferably, setting capillary force of the used-fuel storing tank 40 larger than capillary force present in the fuel electrode body 21 and/or the fuel-supplying member 30 brought into contact with the fuel electrode body 21 makes it possible to flow stably and continuously the liquid fuel directly from the fuel-storing vessel 10 and the respective unit cells 20, 20 to the used-fuel storing tank without bringing about back flow and interruption.

Further, assumed in the above fuel cell is a structure in which the liquid fuel can smoothly be supplied as it is without vaporizing without using specifically auxiliary appliances such as a pump, a blower, a fuel carburetor and a condenser, and therefore it becomes possible to reduce a size of the fuel cell.

Accordingly, in the fuel cell of the above embodiment, it becomes possible to turn the whole part of the fuel cell into a cartridge, and provided is the small-sized fuel cell which can be used as an electric power source for portable electronic appliances such as cellular phones and note type personal computers.

In the embodiment described above, a structure in which two unit cells 20 are used has been shown, and a required electromotive force can be obtained by increasing the number of the unit cells 20 joined (serial or parallel) according to the use purposes of the fuel cell.

Figure 5:
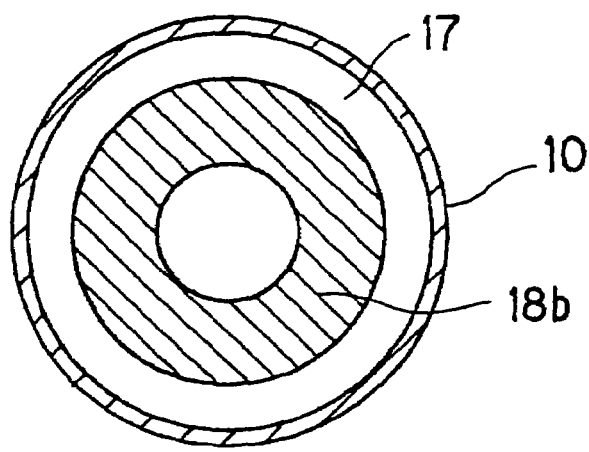
FIGS. 5(a) and (b) are transverse cross-sectional drawings showing essential parts in the respective modified examples of the fuel reservoir for a fuel cell of the third embodiment according to the present invention.
Figure 5:
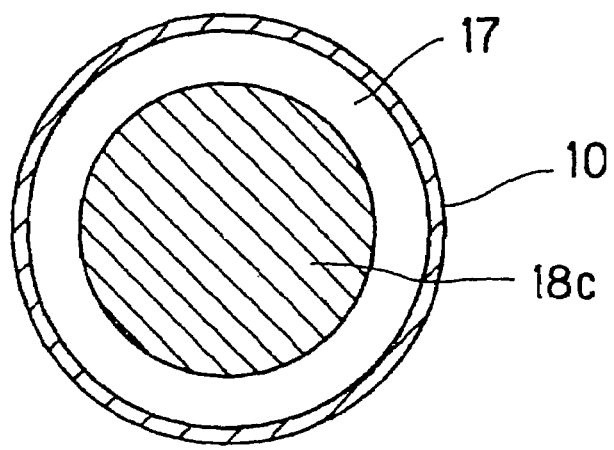

FIGS. 5(*a*) and (*b*) show the modified examples of the fuel reservoir A of the foregoing first embodiment according to the present invention.

FIG. 5(*a*) shows that a follower auxiliary member 18*b* comprises a structure having a hollow body having the respective characteristics described above. The number and the size of the hollow body shall not specifically be restricted as long as a follower 17 into which the follower auxiliary member 18*b* of the hollow body is inserted follows well without causing discontinuity of following as a fuel is consumed with electric power generation in the fuel cell even when the fuel is consumed at a large speed or when a fuel-storing vessel of a tube type has a large diameter.

FIG. 5(*b*) shows that the follower auxiliary member 18 comprises a porous body having the respective characteristics described above and having continuous pores or independent pores, and this porous body 18*c* is impregnated with an insoluble or slightly soluble liquid or a gelatinous matter of the above liquid.

The above embodiments (modified examples) are used in the same manner as in the first embodiment described above and exhibit the same function.

Figure 6:
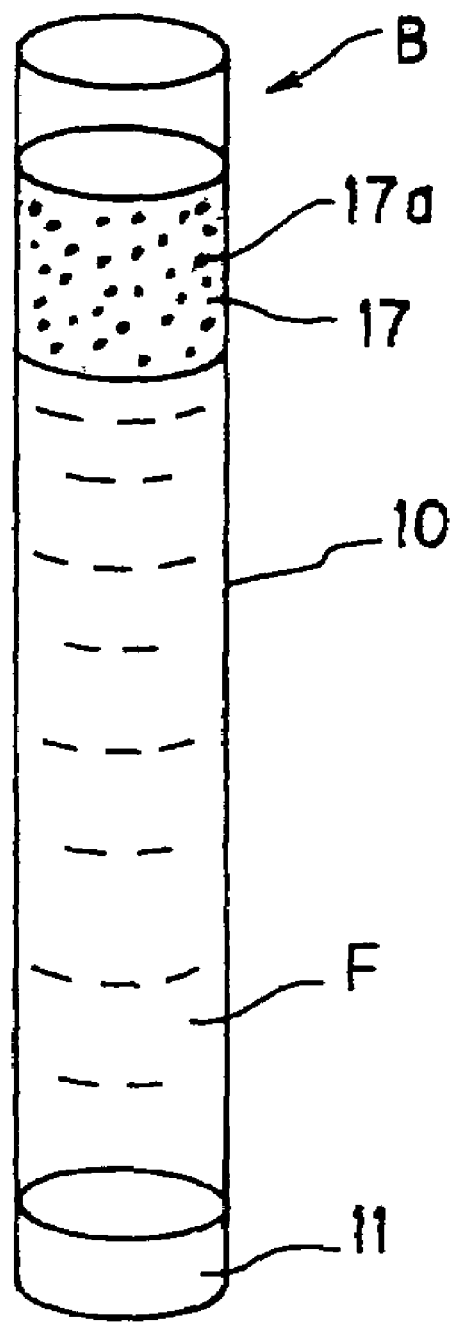
FIG. 6 is an outline drawing in a vertical cross-sectional embodiment showing the fuel reservoir for a fuel cell of the second embodiment according to the present invention.
Figure 7:
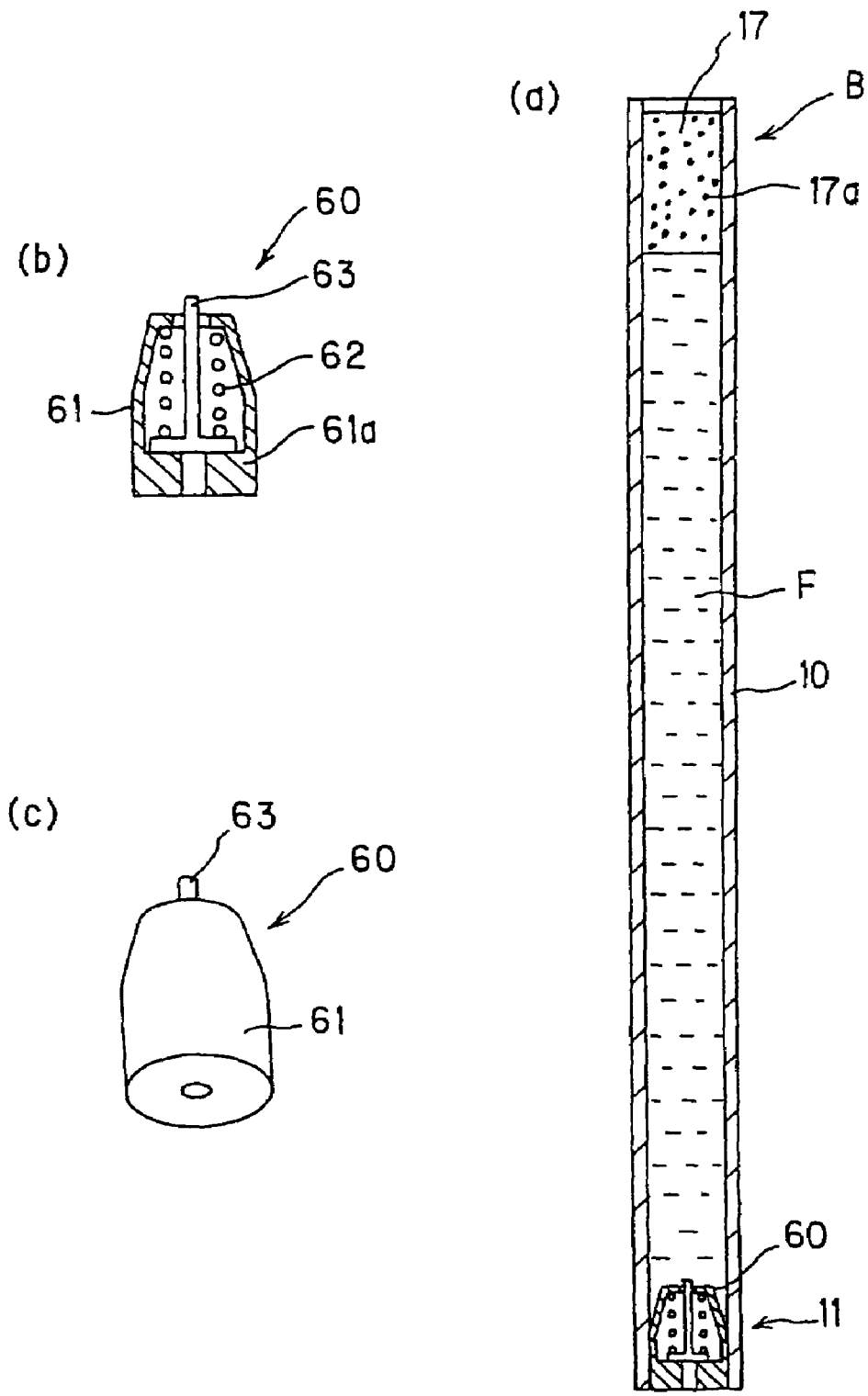
FIG. 7(a) to (c) shows the fuel reservoir for a fuel cell of the second embodiment according to the present invention, wherein (a) is the outline drawing shown in a vertical cross-sectional embodiment; (b) is a vertical cross-sectional drawing of the valve; (c) is a perspective drawing of the valve.

FIG. 6 and FIG. 7 show the fuel reservoir B of another embodiment (second embodiment) in the present invention. A fuel reservoir having the same structure and exhibiting the same effects as those of the fuel reservoir for a fuel cell of the first embodiment described above shall be given the same reference numerals as in FIG. 1, and the explanations thereof shall be omitted.

The fuel reservoir B for a fuel cell of the second embodiment is different, as shown in FIGS. 6 and (7)(*a*) to (*c*), from the first embodiment described above only in that the follower is constituted, in place of the follower 17 into which the follower auxiliary member 18 is inserted in the first embodiment described above, from a kneaded matter of a liquid which is insoluble or slightly soluble in the same liquid fuel as described above or a gelatinous matter of the liquid with solids comprising resin pieces and/or hollow resin pieces and in that the follower is constituted from such a matter that a specific gravity of the follower is 90 to 200% based on a specific gravity of the liquid fuel as is the case with what has been described above and in that the valve having a slit of the first embodiment is changed to a valve having a structure in which it is closed by a resilient body such as a spring member and opened by inserting a liquid fuel-supplying member. It is used in the same manner as in the first embodiment described above.

The solids 17*a* comprising the resin pieces and/or the hollow resin pieces are used in order to further lower a specific gravity of the above follower than a specific gravity of a follower comprising the insoluble or slightly soluble liquid alone or a follower comprising the gelatinous matter of the above liquid alone and allow the follower to follow well without causing discontinuity of following even when the fuel is consumed at a large speed or when the fuel-storing vessel of a tube type has a large diameter in order to load a large amount of the liquid fuel. For example, the resin pieces and the hollow resin pieces having a lower specific gravity than that of the liquid fuel F used can be used.

The resin includes, for example, polypropylene, ethylene.vinyl alcohol copolymer resins, polyacrylonitrile, nylon, polyethylene terephthalate, polycarbonate, polystyrene, polyvinylidene chloride, polyvinyl chloride and various rubbers.

The shape of the solid 17a comprising the above resin pieces and/or hollow resin pieces shall not specifically be restricted and includes, for example, a spherical shape, an elliptical shape, a cubic shape, a rectangular prism shape, a triangular prism shape and a cylindrical shape.

A use amount of the above solids 17a is varied according to a specific gravity of the liquid fuel used and a specific gravity of the liquid used for the follower, and a volume of the solids is preferably 10 to 90%, more preferably 30 to 70% based on the total volume of the follower 17.

The follower of the second embodiment is obtained by kneading the solids 17a described above with the insoluble or slightly soluble liquid having the constitution described above or the gelatinous matter of the liquid.

In the fuel reservoir B detachably connected with the fuel cell main body in the second embodiment, the follower 12 moves as the fuel is consumed with electric power generation by the fuel cell as is the case with the first embodiment described above to follow reduction in a volume of the liquid fuel, and in addition thereto, the follower moves as well when the fuel reservoir (liquid fuel) is heated by operation of the fuel cell, whereby it can follow as well expansion in the volume. Accordingly, provided is the fuel reservoir for a fuel cell which stably supplies the liquid fuel F directly to the fuel cell main body B and does not cause loss of the liquid fuel in storage and which can reduce a size of the fuel cell.

The above valve 60 in the second embodiment has a valve-receiving part 61a in a main body 61, and assumed is a structure in which a valve member 63 having a reverse T-shape in a cross-section is always pressed to the valve-receiving part 61a by a resilient body 62 such as a spring member to close the valve and in which it is opened by inserting a liquid fuel-supplying member 30 to supply a liquid fuel.

In the fuel cell using the fuel reservoir B thus constituted, the liquid fuel is supplied, as is the case with the first embodiment described above, from the fuel reservoir B to the fuel-supplying member 30 inserted into the valve 60 which is a fuel discharge part, and it is introduced into unit cells 20 by virtue of a penetrating structure.

In the above fuel reservoir B, the follower 17 is constituted from the kneaded matter of the liquid which is insoluble or slightly soluble in the liquid fuel or the gelatinous matter of the liquid with the solids comprising the resin pieces and/or the hollow resin pieces and constituted from such a matter that a specific gravity of the follower is 90 to 200% based on a specific gravity of the liquid fuel as is the case with what has been described above, and therefore the follower can be allowed to follow well without causing discontinuity of following even when the fuel is consumed at a large speed or when the fuel-storing vessel of a tube type has a large diameter in order to load a large amount of the liquid fuel.

In the above embodiment, the fuel reservoir B detachably connected with the fuel cell main body is equipped with a fuel-storing vessel 10 of a tube type for storing a liquid fuel F and a fuel discharge part 11, and the fuel discharge part 11 is provided with the valve 60 for sealing communication between the inside and the outside of the fuel-storing vessel 10, so that provided is the fuel reservoir for a fuel cell which does not cause loss of the liquid fuel in storage and stably supplies the liquid fuel F directly to a fuel cell main body N and which can reduce a size of the fuel cell.

Figure 8:
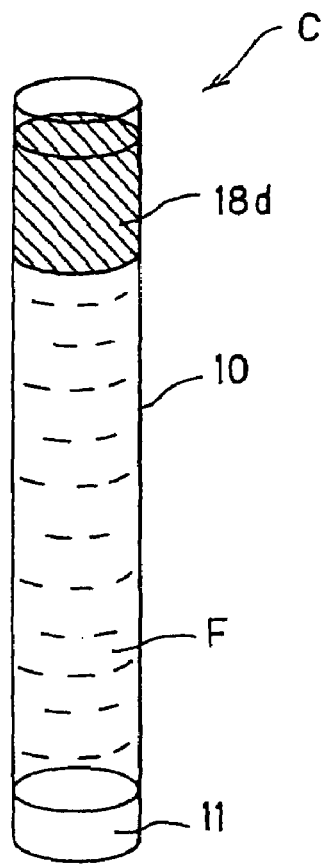
FIGS. 8(a) and (b) show the fuel reservoir for a fuel cell of the third embodiment according to the present invention, wherein (a) is the outline drawing shown in a vertical cross-sectional embodiment, and (b) is the transverse cross-sectional drawing showing an essential part thereof.
Figure 8:
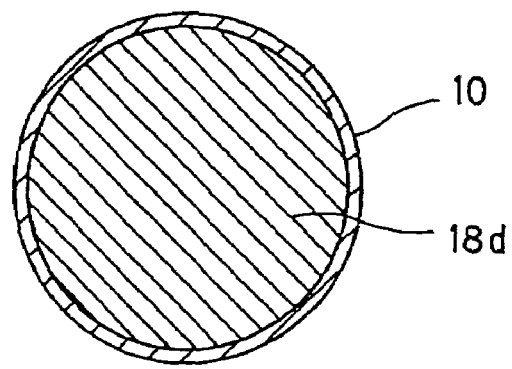

FIG. 8 shows a fuel reservoir C for a fuel cell of the third embodiment according to the present invention. The follower of this embodiment is different from that of the first embodiment described above only in that it comprises a solid 18d which is insoluble and has no swelling property and in that it is brought into close contact with the inner wall of a fuel-storing vessel 10, and it is used in the same manner as in the first embodiment described above.

The solid 18d which is insoluble and has no swelling property can be constituted from, for example, a substance comprising at least one of polypropylene, ethylene.vinyl alcohol copolymer resins, polyacrylonitrile, nylon, polyethylene terephthalate, polycarbonate, polystyrene, polyvinylidene chloride, polyvinyl chloride, various rubbers and elastomers.

In the above embodiment, an inner wall surface of a fuel-storing vessel 11 and/or an outer surface of the solid 18d is preferably subjected to water repellent film-forming treatment by coating with a water repellent agent of a silicone base or a fluorine base in order to further improve following of the follower 18d.

Also in a fuel reservoir D detachably connected with the fuel cell main body in the above third embodiment, the follower 17 moves without causing discontinuity of following as the fuel is consumed by electric power generation in the fuel cell as is the case with the first embodiment described above, whereby it meets reduction in a volume of the liquid fuel, and in addition thereto, the follower moves as well when the fuel reservoir (liquid fuel) is heated with fuel cell operation, whereby it can meet as well expansion in the volume. Accordingly, provided is the fuel reservoir for a fuel cell which stably supplies the liquid fuel F directly to the fuel cell main body N and does not cause loss of the liquid fuel in storage and which can reduce a size of the fuel cell even when is the fuel cell is consumed at a large speed or when the fuel-storing vessel of a tube type has a large diameter.

Figure 9:
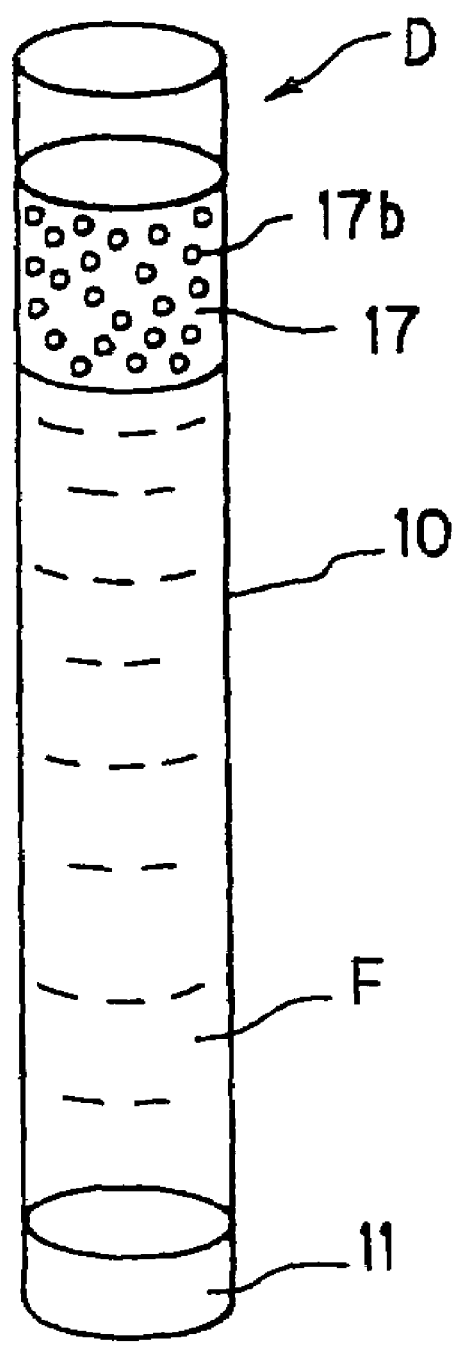
FIG. 9 is an outline drawing in a vertical cross-sectional embodiment showing the fuel reservoir for a fuel cell of the fourth embodiment according to the present invention.

FIG. 9 shows a fuel reservoir D of the fourth embodiment according to the present invention. The follower of this embodiment is a follower in which bubbles 17b comprising an inert gas such as nitrogen gas are contained in place of the solid 17a comprising the resin pieces and/or the hollow resin pieces in the second embodiment described above, and a size of the bubbles and a volume occupied in the follower by the bubbles fall preferably in the same ranges as in the solid of the second embodiment described above comprising the resin pieces and the like The follower of the present fourth embodiment is obtained by mixing the bubbles 14a with an insoluble or slightly soluble liquid or a gelatinous matter of the liquid.

The fuel reservoir D detachably connected with a fuel cell main body in the above fourth embodiment exhibits as well the same functions as in the first embodiment described above.

Figure 10:
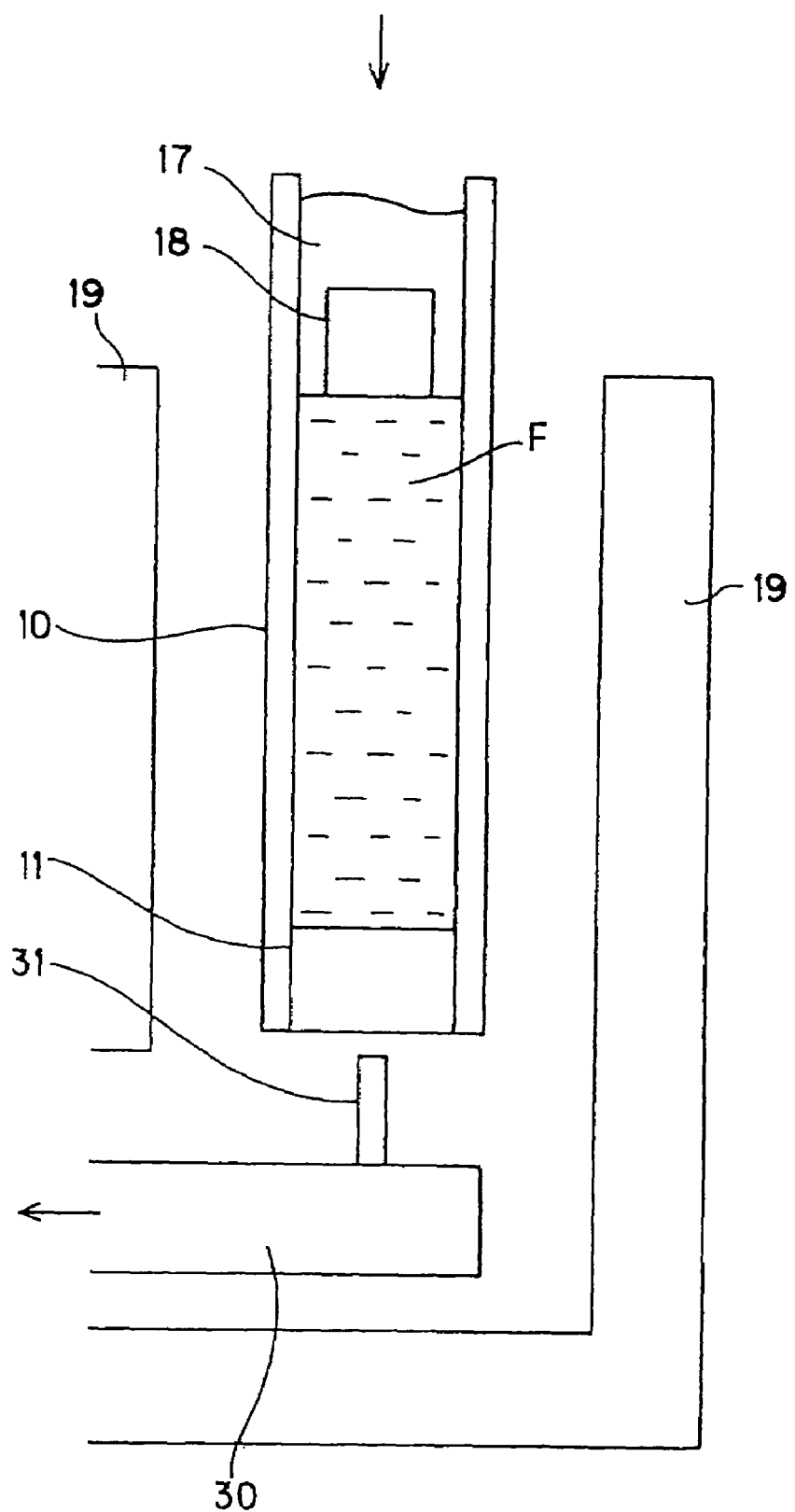
FIG. 10 is a partial cross-sectional drawing showing a state prior to installing the fuel reservoir for a fuel cell of the present invention in the fuel cell main body.
Figure 11:
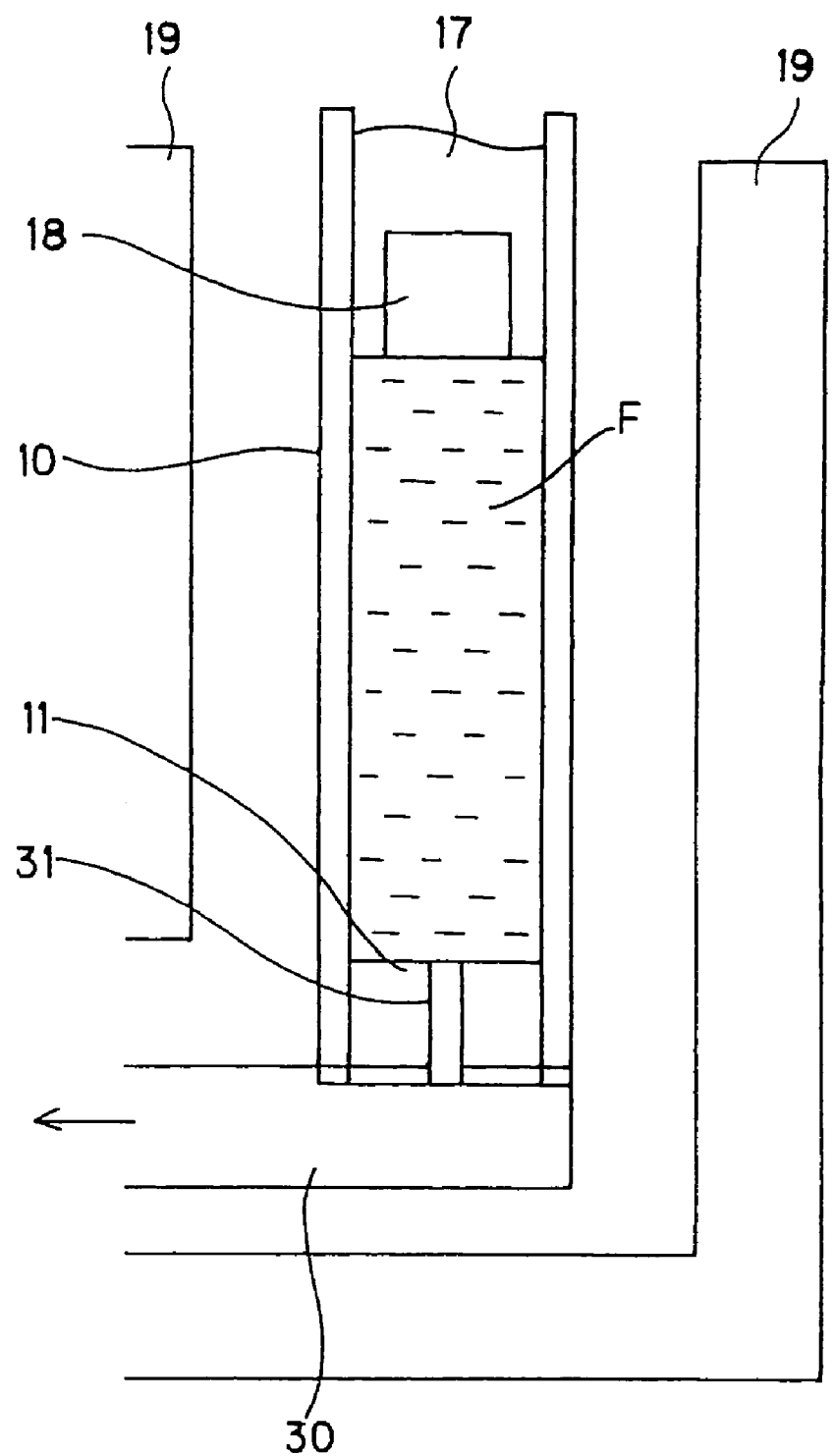
FIG. 11 is a partial cross-sectional drawing showing a state in which the fuel reservoir for a fuel cell of the present invention is installed in the fuel cell main body.

FIG. 10 and FIG. 11 show another embodiment of connection with a fuel cell main body. In the following embodiment, the same reference numerals as in FIG. 1 shall be given to those having the same structure and the same effects as in the fuel cell main body of the first embodiment described above, and explanations thereof shall be omitted.

The above embodiment is different, as shown in FIG. 10 and FIG. 11, from the first embodiment described above only in that the fuel reservoir is connected with a fuel-supplying member 30 via a fuel-supplying tube 31 inserted into a valve of a fuel discharge part 11 and in that a follower auxiliary member 18 comprising a PP-made resinous body in a follower 17 is not projected into a liquid fuel F.

Assumed is, though not illustrated, a structure in which unit cells 20, 20 are joined in series or in parallel with a tip of the fuel-supplying member 30 (an arrow direction in FIG. 10 and FIG. 11) as is the case with the first embodiment (FIG. 3) described above.

In the fuel cell of the above embodiment, the reservoir C comprising a cartridge structure in which a fuel reservoir is exchangeable and which has visibility is equipped with a fuel-storing vessel 10 for storing a liquid fuel F, a fuel discharge part 11 having a valve and a follower 17 which moves as the fuel is consumed and into which a follower auxiliary member 18 having a cross-sectional area of 50% or more based on a cross-sectional area of the fuel-storing vessel 10 in a diameter direction is inserted, and the liquid fuel in the inside of the cartridge structure can visually be observed. Accordingly, the consumption state of the fuel can visually be observed with ease, and the liquid fuel is prevented by virtue of the follower from being lost in storing. Capillary force of the fuel-supplying member 30 makes it possible to stably and continuously supply the fuel directly to each of the respective unit cells from the fuel-storing vessel 10 without causing back flow and interruption.

The fuel reservoir for a fuel cell of the present invention shall not be restricted to the respective embodiments described above and can be varied to various extents within the scope of the technical concept of the present invention.

For example, the unit cell 20 having a cylindrical shape is used, but it may have other shapes such as a prism shape and a tabular shape. It may be joined with the fuel-supplying member 30 in parallel as well as in series.

In the embodiment described above, the present invention has been explained in the form of a direct methanol fuel cell, but the present invention shall not be restricted to the direct methanol fuel cell described above as long as it is a fuel reservoir detachably connected to a fuel cell main body, wherein the fuel reservoir is equipped with a fuel-storing vessel for storing a liquid fuel, a fuel discharge part and a follower which seals the liquid fuel and moves as the liquid fuel is consumed and into which a follower auxiliary member is inserted at a rear end of the liquid fuel; the follower auxiliary member has no fluidity and is insoluble in the liquid fuel, and it has a cross-sectional area of 50% or more based on a cross-sectional area of the fuel-storing vessel in a diameter direction. It can suitably be applied as well to a fuel cell including a reforming type. Further, even when an amount of the follower is increased to meet a case where the fuel-storing vessel of a tube type is increased in a diameter in order that a large volume (for example, 100 ml or more) of the liquid fuel is loaded, the follower can be allowed to follow well without causing discontinuity of following.

Further, the fuel cell main body is constituted by constructing an electrolyte layer on the outer surface of a fuel electrode body comprising a fine porous carbonaceous substance and constructing an air electrode layer on the outer surface of the electrolyte layer, but a structure of the fuel cell main body shall not specifically be restricted and may be, for example, a fuel cell main body assuming a constitution in which a porous carbonaceous substance having electric conductivity is a base material and a unit cell obtained by forming the respective layers of electrode/electrolyte/electrode on the surface of the base material or a jointed body obtained by connecting two or more of the unit cells is provided and in which the above base material is impregnated with a liquid fuel via a fuel-supplying member and comprising a structure in which a surface of the electrode formed on the outer surface of the base material is exposed to air.

Further, the slit valve of FIG. 2 and the valve member of FIG. 7 have been given as the valve provided in the fuel discharge part 11, but the structure of the valve shall not specifically be restricted as long as it is a structure in which communication between the inside and the outside of the fuel-storing vessel 10 is suitably sealed.

EXAMPLES

Next, the present invention shall be explained in further details with reference to examples and comparative examples, but the present invention shall not be restricted to the examples described below.

Examples 1 to 5 and Comparative Examples 1 to 3

Fuel reservoirs (whole structure: based on FIG. 2) comprising tubes having structures shown below and compositions of followers A to C and resin pieces and follower auxiliary members 1 to 5 were prepared in combinations shown in Table 2 described below. They were filled with 2 g of a liquid fuel (70 wt % methanol liquid, specific gravity: 0.87), and the liquid fuel was discharged from a fuel discharge pore at a rate of 0.5 ml/minute to evaluate a discharge property thereof by the following evaluation method.

The results thereof are shown in the following Table 2.

Constitution of fuel-storing vessel: tube 1

Length 100 mm, outer diameter 5.4 mm, inner diameter 4.0 mm, polypropylene-made extruded tube, cross-sectional area of tube: 12.56 mm$^2$ Constitution of fuel discharge part (valve and others, based on FIG. 2)

Length 5 mm, outer diameter 4 mm, inner diameter 1 mm, made of silicone rubber

Physical property of liquid fuel 70 wt % methanol liquid (specific gravity: 0.87)

Composition of follower A

A gelatinous follower (specific gravity: 0.90) having the following blend composition was used.

| | |
|---|---|
| Mineral oil: Diana Process Oil MC-W90 (manufactured by Idemitsu Kosan Co., Ltd.) | 93 parts by weight |
| Hydrophobic silica: Aerosil R-974D (manufactured by Nippon Aerosil Co., Ltd., BET surface area: 200 m$^2$/g) | 6 parts by weight |
| Silicone base surfactant: SILWET FZ-2171 (manufactured by Nippon Unicar Co., Ltd.) | 1 part by weight |

Composition of follower B

A gelatinous follower (specific gravity: 1.0) having the following blend composition was used.

| | |
|---|---|
| Silicone oil: KF-96 30,000 (manufactured by Shin-Etsu Silicone Co., Ltd.) | 93 parts by weight |
| Hydrophobic silica: Aerosil R-974D (manufactured by Nippon Aerosil Co., Ltd., BET surface area: 200 m$^2$/g) | 6 parts by weight |
| Silicone base surfactant: SILWET FZ-2171 (manufactured by Nippon Unicar Co., Ltd.) | 1 part by weight |

Composition of follower C

A gelatinous follower (specific gravity: 1.0) having the following blend composition was used.

| | |
|---|---|
| Polybutene: Nissan Polybutene 015N (MW = 580, manufactured by NOF Corporation) | 94 parts by weight |
| Hydrophobic silica: Aerosil R-974D (manufactured by Nippon Aerosil Co., Ltd., BET surface area: 200 m²/g) | 5 parts by weight |
| Silicone base surfactant: SILWET FZ-2110 (manufactured by Nippon Unicar Co., Ltd.) | 1 part by weight |

Resin pieces
  Material: made of polypropylene, shape: spherical, maximum length: 1 mm, specific gravity: 0.9, volume occupied in follower: 40%
Follower auxiliary member 1
  Material: made of polypropylene, shape: cylindrical, structure: hollow, whole length: 8 mm (60% based on the whole length of the follower), specific gravity: 0.5, diameter: 3.58 mm, cross-sectional area: 80% (10.05 mm²/12.56 mm²) based on the cross-sectional area of the fuel-storing vessel 10 in a diameter direction
Follower auxiliary member 2
  Material: made of polypropylene, shape: cylindrical, structure: hollow, whole length: 8 mm (60% based on the whole length of the follower), specific gravity: 0.5, diameter: 3.10 mm, cross-sectional area: 60% (7.54 mm²/12.56 mm²) based on the cross-sectional area of the fuel-storing vessel 10 in a diameter direction
Follower auxiliary member 3
  Material: made of polypropylene, shape: cylindrical, structure: hollow, whole length: 8 mm (60% based on the whole length of the follower), specific gravity: 0.5, diameter: 2.83 mm, cross-sectional area: 50% (6.28 mm²/12.56 mm²) based on the cross-sectional area of the fuel-storing vessel 10 in a diameter direction
Follower auxiliary member 4
  Material: made of polypropylene, shape: cylindrical, structure: hollow, whole length: 8 mm (60% based on the whole length of the follower), specific gravity: 0.5, diameter: 2.53 mm, cross-sectional area: 40% (5.02 mm²/12.56 mm²) based on the cross-sectional area of the fuel-storing vessel 10 in a diameter direction
Follower auxiliary member 5
  Material: made of polypropylene, shape: cylindrical, structure: hollow, whole length: 8 mm (60% based on the whole length of the follower), specific gravity: 0.5, diameter: 2.20 mm, cross-sectional area: 30% (3.77 mm²/12.56 mm²) based on the cross-sectional area of the fuel-storing vessel 10 in a diameter direction.

Evaluation Method of Discharge Property
  Evaluated according to the following evaluation criteria.

Evaluation Criteria:
○: all the fuel charged could be discharged
Δ: 80% or more of the fuel could be discharged
X: discharged amount of the fuel was 50% or more and less than 80%
XX: discharged amount of the fuel was less than 50%

TABLE 2

| | Example | | | | | Comparative Example | | |
|---|---|---|---|---|---|---|---|---|
| | 1 | 2 | 3 | 4 | 5 | 1 | 2 | 3 |
| Kind of tube | 1 | 1 | 1 | 1 | 1 | 1 | 1 | 1 |
| Liquid fuel | 70 wt % methanol liquid | | | | | | | |
| Kind of follower | A | B | C | C | C | C | C | C |
| Resin pieces | Present | None | None | None | None | None | None | None |
| Follower auxiliary member | None | 1 | 1 | 2 | 3 | 4 | 5 | None |
| Evaluation | ○ | ○ | ○ | ○ | ○ | Δ | X | XX |

As apparent from the results shown in Table 2 described above, it has been found that in fuel reservoirs equipped with the follower in which the resin pieces is blended (Example 1) or the follower into which the follower auxiliary member is inserted (Examples 2 to 5) in Examples 1 to 5 falling in the scope of the present invention, the followers move well without causing discontinuity of following as the fuel is consumed and that the fuel can completely be consumed.

In contrast with this, it has been found that in Comparative Examples 1 and 2 in which a cross-sectional area of the follower auxiliary members is not satisfactory and Comparative Example 3 in which the follower auxiliary member is not inserted, the fuel can not completely be consumed and that they are not preferred in terms of the supplying efficiency.

INDUSTRIAL APPLICABILITY

The liquid fuel reservoir of the present invention can be used for storing a fuel in a small-sized fuel cell which is suitably used as an electric power source for portable electronic appliances such as cellular phones, note type personal computers and PDA.

What is claimed is:

1. A fuel reservoir for a fuel cell detachably connected with a fuel cell main body, wherein the fuel reservoir is equipped with a fuel-storing vessel of a tube type for storing a liquid fuel, a fuel discharge part at a front end of the fuel-storing vessel, and a follower which is liquid or gelatinous and moves inside the fuel-storing vessel as the liquid fuel is consumed, and which seals the liquid fuel at a rear end of the liquid fuel, and a follower auxiliary member which is inserted into the follower, and which has no fluidity and is insoluble in the liquid fuel, and which has a cross-sectional area of 50% or more based on a cross-sectional area of the fuel-storing vessel in a diameter direction, wherein the liquid fuel is stored in a chamber which is surrounded by the fuel-storing vessel, the fuel discharge part and the follower with the follower auxiliary member.

2. The fuel reservoir for a fuel cell as described in claim 1, wherein the follower comprises at least one selected from liquids which are insoluble or slightly soluble in the liquid fuel and gelatinous matters of the liquids, and the follower has a specific gravity of 90 to 200% based on a specific gravity of the liquid fuel.

3. A fuel reservoir for a fuel cell detachably connected with a fuel cell main body, wherein the fuel reservoir is equipped with a fuel-storing vessel for storing a liquid fuel, a fuel discharge part and a follower which seals the liquid fuel and moves as the liquid fuel is consumed at a rear end of the liquid fuel; the follower comprises a kneaded matter of a liquid which is insoluble or slightly soluble in the liquid fuel or a gelatinous matter of the liquid with solid comprising resin pieces and/or hollow resin pieces, and the follower has a specific gravity of 90 to 200% based on a specific gravity of the liquid fuel.

4. The fuel reservoir for a fuel cell as described in claim 2, wherein the insoluble or slightly soluble liquid comprises a non-volatile or slightly volatile organic solvent, and the gelatinous matter of the insoluble or slightly soluble liquid comprises a non-volatile or scarcely volatile organic solvent and a thickener.

5. The fuel reservoir for a fuel cell as described in claim 4, wherein the non-volatile or scarcely volatile organic solvent is at least one selected from polybutene, mineral oils, silicone oils and liquid paraffins.

6. The fuel reservoir for a fuel cell as described in claim 4, wherein the thickener is at least one selected from styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

7. The fuel reservoir for a fuel cell as described in claim 1, wherein the follower auxiliary member is any of solid, a hollow structure and a porous body.

8. The fuel reservoir for a fuel cell as described in claim 1, wherein the liquid fuel is at least one selected from a methanol solution, an ethanol solution, dimethyl ether, formic acid, hydrazine, an ammonia solution, ethylene glycol, a saccharide aqueous solution and sodium boron hydride.

9. The fuel reservoir for a fuel cell as described in claim 1, wherein a surface free energy of at least a wall face of the fuel-storing vessel which is brought into contact with the liquid fuel is controlled to a lower value than a surface free energy of the liquid fuel.

10. The fuel reservoir for a fuel cell as described in claim 1, wherein the fuel cell main body assumes a structure in which plural unit cells each of which is formed by constructing an electrolyte layer on an outer surface of a fuel electrode body and constructing an air electrode layer on an outer surface of the electrolyte layer are joined and in which a fuel-supplying member connected with the fuel reservoir is connected with the unit cells to supply the liquid fuel.

11. A fuel reservoir for a fuel cell detachably connected with a fuel cell main body, wherein the fuel reservoir is equipped with a fuel-storing vessel for storing a liquid fuel, a fuel discharge part and a follower which is liquid or gelatinous and seals the liquid fuel and moves as the liquid fuel is consumed and into which a follower auxiliary member is inserted at a rear end of the liquid fuel, and the follower auxiliary member has a hollow structure or a porous body which is insoluble in the liquid fuel.

12. The fuel reservoir for a fuel cell as described in claim 3, wherein the insoluble or slightly soluble liquid comprises a non-volatile or slightly volatile organic solvent, and the gelatinous matter of the insoluble or slightly soluble liquid comprises a non-volatile or scarcely volatile organic solvent and a thickener.

13. The fuel reservoir for a fuel cell as described in claim 12, wherein the non-volatile or scarcely volatile organic solvent is at least one selected from polybutene, mineral oils, silicone oils and liquid paraffins.

14. The fuel reservoir for a fuel cell as described in claim 12, wherein the thickener is at least one selected from styrene base thermoplastic elastomers, vinyl chloride base thermoplastic elastomers, olefin base thermoplastic elastomers, polyamide base thermoplastic elastomers, polyester base thermoplastic elastomers, polyurethane base thermoplastic elastomers, calcium salts of phosphoric acid esters, fine particle silica and acetalkoxyaluminum dialkylates.

15. The fuel reservoir for a fuel cell as described in claim 1, wherein a front end of the follower seals the liquid fuel at the rear end of the liquid fuel and the follower auxiliary member is inserted into the front end of the follower.

* * * * *